United States Patent
Evans et al.

(10) Patent No.: US 11,236,613 B2
(45) Date of Patent: Feb. 1, 2022

(54) ENCAPSULATION SYSTEM AND METHOD OF INSTALLING A ROCK BOLT

(71) Applicant: DYWIDAG-SYSTEMS INTERNATIONAL PTY LIMITED, Bennett's Green (AU)

(72) Inventors: David William Evans, Rankin Park (AU); Derek Colin Hird, New Lambton (AU)

(73) Assignee: DYWIDAG-SYSTEMS INTERNATIONAL PTY LIMITED, New South Wales (AU)

( * ) Notice: Subject to any disclaimer, the term of this patent is extended or adjusted under 35 U.S.C. 154(b) by 13 days.

(21) Appl. No.: 16/645,231

(22) PCT Filed: Sep. 7, 2018

(86) PCT No.: PCT/AU2018/000170
§ 371 (c)(1),
(2) Date: Mar. 6, 2020

(87) PCT Pub. No.: WO2019/046883
PCT Pub. Date: Mar. 14, 2019

(65) Prior Publication Data
US 2020/0300089 A1    Sep. 24, 2020

(30) Foreign Application Priority Data

Sep. 8, 2017 (AU) ............................ 2017903643

(51) Int. Cl.
*E21D 20/02* (2006.01)
*E21D 21/00* (2006.01)
*F16B 13/14* (2006.01)

(52) U.S. Cl.
CPC .......... *E21D 20/026* (2013.01); *E21D 21/008* (2013.01); *E21D 21/0033* (2013.01); *F16B 13/143* (2013.01); *F16B 2013/147* (2013.01)

(58) Field of Classification Search
CPC ........................... E21D 20/026; E21D 20/023
See application file for complete search history.

(56) References Cited

U.S. PATENT DOCUMENTS 3,324,663 A * 6/1967 McLean ............... E21D 20/026
                                                       405/259.6
4,303,354 A    12/1981 McDowell, Jr.
(Continued)

FOREIGN PATENT DOCUMENTS

| CA | 2 820 010 A1 | 12/2005 |
| CN | 104632259 B | 1/2017 |
| EP | 0 251 887 A1 | 7/1988 |

OTHER PUBLICATIONS

Machine translaiton of CN104632259B, accessed Sep. 29, 2021.*
(Continued)

*Primary Examiner* — Janine M Kreck
(74) *Attorney, Agent, or Firm* — Ohlandt, Greeley, Ruggiero & Perle, L.L.P.

(57) ABSTRACT

An encapsulation system for use in securing a rock bolt in a bore hole drilled into a rock face to be stabilised, the encapsulation system comprising at least two separate encapsulation mediums and one or more elongate cartridges containing the encapsulation mediums, each the cartridge having a frangible casing, the encapsulation mediums including: a first encapsulation medium comprising a curable first resin formulation; and a second encapsulation medium; wherein, following use in securing a rock bolt, the (Continued)

second encapsulation medium has a lower bond strength and/or a lower compressive strength than the first resin formulation.

19 Claims, 9 Drawing Sheets

(56) References Cited

U.S. PATENT DOCUMENTS

| | | | |
|---|---|---|---|
| 4,659,258 A | 4/1987 | Scott | |
| 8,920,087 B2 | 12/2014 | Buder et al. | |
| 2008/0219775 A1 | 9/2008 | Mercier-Langevin et al. | |
| 2012/0282059 A1 | 11/2012 | Buder et al. | |

OTHER PUBLICATIONS

International Search Report dated Oct. 23, 2018 from corresponding International Patent Application No. PCT/AU2018/000170, 4 pages.
Written Opinion dated Oct. 23, 2018 from corresponding International Patent Application No. PCT/AU2018/000170, 6 pages.
Extended European Search Report dated May 4, 2021 from corresponding European Patent Application No. 18853017.4, 16 pages.

\* cited by examiner

ENCAPSULATION SYSTEM AND METHOD OF INSTALLING A ROCK BOLT

FIELD

The present invention relates to the field of strata control in civil engineering and mining operations, and in particular relates to a method of installing a rock bolt to secure the roof or wall of a mine, tunnel or other ground excavation and an encapsulation system for use in such a method.

BACKGROUND

Rock bolts are utilised to secure the roof or walls of an underground mine, tunnel or other ground excavation by inserting the rock bolt into a bore hole drilled in the face of the rock to be secured and securing the rock bolt within the hole. Rock bolts have an elongate load bearing element, which is typically either in the form of a rigid steel bar or in the form of a cable bolt (sometimes called a strand bolt) comprising a plurality of wires helically wound into the form of a cable/strand.

One known means for securing the rock bolt into a bore hole is with the use of an encapsulation medium in the form of a resin. After first drilling a bore hole into the rock face, a sausage-like two-component resin filled cartridge is inserted into the bore hole, followed by a rock bolt which pushes the resin filled cartridge toward the blind end of the bore hole. The rock bolt is typically rotated by the installation rig as it is thrust upwardly, shredding the frangible cartridge casing and mixing the resin components as the rock bolt is thrust toward the blind end of the bore hole. Rotation of the rock bolt is then stopped for a few seconds to allow the mixed resin to cure.

In one form of installation, the resin only encapsulates the leading end portion of the rock bolt, thereby forming a point anchor. In such an installation, the rock bolt may be tensioned along its unsupported length. For rigid bar forms of rock bolt, the rock bolt may be tensioned by way of a drive nut mounted on a threaded trailing end portion of the bar that bears against a plate washer engaging the rock face adjacent the bore hole opening. For cable bolt forms of rock bolt, the rock bolt may be tensioned by way of a barrel and wedge assembly mounted on the cable that bears against the plate washer, with the trailing end portion of the cable being tensioned whilst the barrel and wedge assembly is held against the plate washer.

In another form of installation, the resin fully encapsulates the rock bolt along its length, providing both corrosion protection along the length of the rock bolt and additional anchorage of the rock bolt within the bore hole. In rock bolting applications where dynamic ground movement is envisaged, such as resulting from rock bursts or other seismic events, it is desirable to enable the rock bolt to withstand the rock movement by allowing for yielding of the rock bolt within the encapsulating resin. To enable such yielding, it has previously been proposed to provide a de-bonded portion of the rock bolt, either by locating a plastic tube over a central region of the rock bolt or providing a smooth outer profile over the central region of the rock bolt (for rigid bar forms of rock bolt) so as to decouple the rock bolt from the encapsulating resin over the central region of the rock bolt. A leading portion of the rock bolt is thus point-anchored to the upper region of the bore hole, whilst a trailing portion of the rock bolt is anchored to the lower part of the bore hole, providing anchorage of the trailing portion of the rock bolt, (in conjunction with the plate washer) and also helping to contain the rock face. The central portion of the rock bolt, being de-bonded from the resin, is able to yield during dynamic ground movement events.

OBJECT OF THE INVENTION

It is an object of the present invention to provide an alternate encapsulation system for securing rock bolts and an associated alternate method of installing rock bolts.

SUMMARY OF INVENTION

In a first aspect the present invention provides an encapsulation system for use in securing a rock bolt in a bore hole drilled into a rock face to be stabilised, said encapsulation system comprising at least two separate encapsulation mediums and one or more elongate cartridges containing said encapsulation mediums, each said cartridge having a frangible casing, said encapsulation mediums including:

a first encapsulation medium comprising a curable first resin formulation; and a second encapsulation medium;

wherein, following use in securing a rock bolt, said second encapsulation medium has a lower bond strength and/or a lower compressive strength than said first resin formulation.

Typically, said second encapsulation medium comprises a curable second resin formulation. Typically, said second resin formulation has a longer curing time than said first resin formulation.

In an alternate embodiment, said second encapsulation medium comprises an inert filler compound.

Typically, said encapsulation system further comprises a third encapsulation medium comprising a curable third resin formulation;

wherein, following use in securing a rock bolt, said second encapsulation medium has a lower bond strength and/or a lower compressive strength than said third resin formulation.

Typically, said third resin formulation has a longer curing time than said first resin formulation. In an alternate embodiment, said second and third resin formulations have the same or substantially similar curing times. Typically, said first resin formulation has a curing time of between 6 to 30 seconds and said third resin formulation has a curing time of 30 seconds or more.

In one embodiment, said encapsulation system comprises a separate said cartridge containing each said encapsulation medium. For embodiments where said encapsulation system comprises said first, second and third encapsulation mediums, said one or more elongate cartridges comprises a first cartridge containing said first encapsulation medium, a second cartridge containing said second encapsulation medium and a third cartridge containing said third resin formulation.

In an alternate embodiment, said encapsulation system comprises a single cartridge containing each of said encapsulation mediums, said encapsulation mediums being arranged in longitudinal succession along an interior of said casing. For embodiments where said encapsulation system comprises said first, second and third encapsulation mediums, said second encapsulation medium is located between said first and third encapsulation mediums.

In a further alternate embodiment, said encapsulation system comprises a single cartridge containing each of said encapsulation mediums, said casing having one or more constrictions formed along its length to define multiple regions along in an interior of said casing, each said region containing one of said encapsulation mediums. For embodiments where said encapsulation system comprises said first, second and third encapsulation mediums, said second encapsulation medium is located between said first and third encapsulation mediums. In a preferred embodiment, the casing has one constriction formed along its length defining a first region and a second region, wherein the first encapsulation medium is contained within the first region, the third encapsulation medium is contained in the second region and the second encapsulation medium is contained in both the second and third regions.

Typically, each of said resin formulations comprises a curable component and a catalyst component.

In a second aspect the present invention provides a method of installing a rock bolt into a bore hole drilled into a rock face to be stabilised, said method comprising:

inserting an encapsulation system into the bore hole, said encapsulation system comprising at least two separated encapsulation mediums and one or more elongate cartridges containing said encapsulation mediums, each said cartridge having a frangible casing, said encapsulation mediums including a first encapsulation medium inserted into the borehole followed by a second encapsulation medium, said first encapsulation medium comprising a curable first resin formulation;

inserting a rock bolt comprising an elongate load bearing element into the bore hole, thrusting said load being element through said encapsulating system towards a blind end of the bore hole and rotating said load bearing element so as to rupture said frangible casing of each said cartridge and mix each of said encapsulation mediums such that said first encapsulation medium encapsulates a leading portion of said load bearing element located adjacent a blind end of said borehole and said second encapsulating medium encapsulates an intermediate portion of said load bearing element extending between said leading portion of said load bearing element and a trailing portion of said load bearing element; and curing said first resin formulation to secure said leading portion of said load bearing element in said bore hole;

wherein, upon completion of said installation, said second encapsulation medium has a lower bond strength and/or a lower compressive strength than said first resin formulation.

Typically, said second encapsulation medium comprises a second resin formulation, said method further comprising curing said second resin formulation.

Typically, said encapsulation system further comprises a third encapsulation medium comprising a curable third resin formulation, inserting said encapsulation system into the bore hole including inserting said third encapsulation medium into the bore hole after said second encapsulation medium, said third encapsulation medium at least partly encapsulating said trailing portion of said load-bearing element, said method further comprising curing said third resin formulation to secure said trailing portion of said load bearing element in said bore hole;

wherein upon completion of said installation, said second encapsulation medium has a lower bond strength and/or a lower compressive strength than said third resin formulation.

In a preferred embodiment, said first resin formulation is fully cured prior to said third resin being fully cured.

Typically, said method further comprises, after curing of said first resin, tensioning said load bearing element. For embodiments where said second encapsulation medium comprises a second resin formulation, said load bearing element is tensioned prior to said second resin being fully cured. For embodiments where said encapsulation system comprises said first, second and third encapsulation mediums, said load bearing element is tensioned prior to said third resin being fully cured.

In one embodiment, said encapsulation system comprises a separate said cartridge containing each said encapsulation medium, inserting said encapsulation system into said bore hole including inserting a first cartridge containing said first encapsulation medium into said bore hole, followed by inserting a second cartridge containing said second encapsulation medium into said bore hole. For embodiments where said encapsulation system comprises said first, second and third encapsulation mediums, inserting said encapsulation system into said bore hole further comprising inserting a third cartridge containing said third resin formulation into the bore hole after said second cartridge.

In alternate embodiments, said resin system comprises a single cartridge containing each of said encapsulation mediums, inserting said encapsulation system into said bore hole including inserting said cartridge into said bore hole with said first encapsulation medium leading.

BRIEF DESCRIPTION OF DRAWINGS

Preferred embodiments of the present invention will now be described, by way of examples only, with reference to the accompanying drawings wherein.

DESCRIPTION OF EMBODIMENTS

Figure 1:
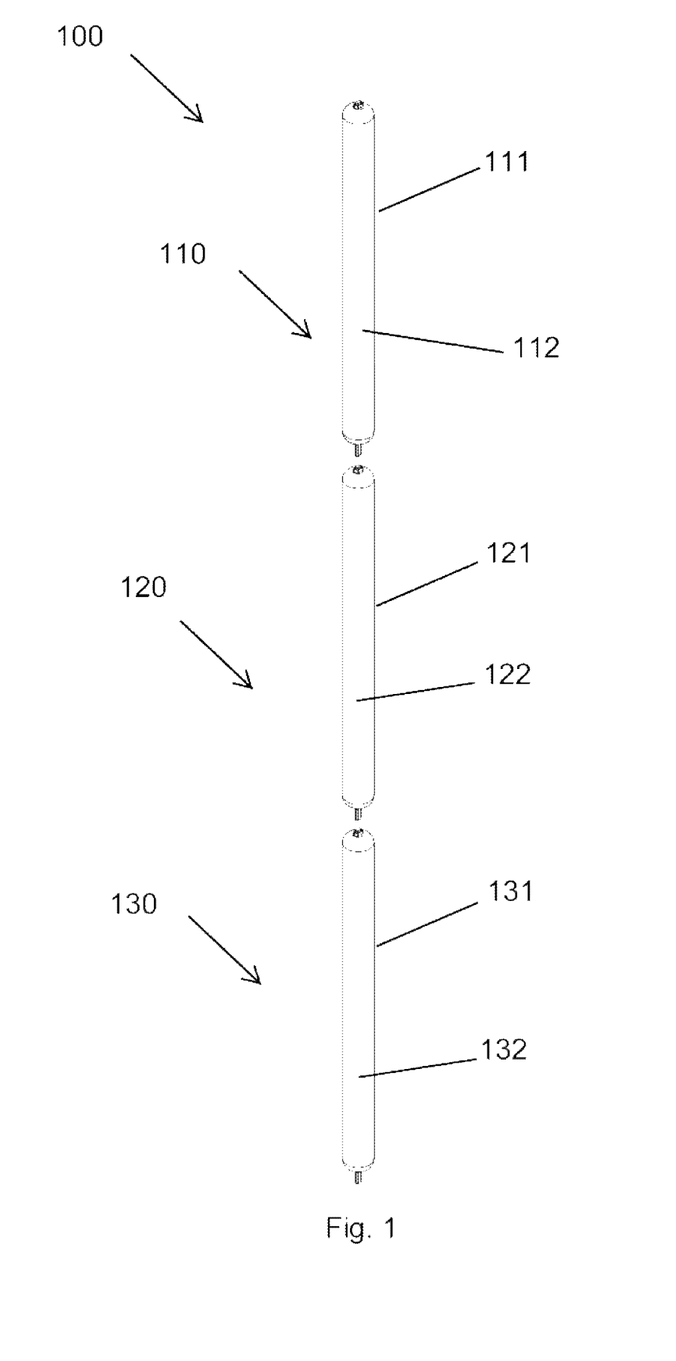
FIG. 1 is an isometric view of an encapsulation system according to a first embodiment.

FIG. 1 depicts an encapsulation system 100, for use in securing a rock bolt in a bore hole drill into a rock face to be stabilised, according to a first embodiment. The encapsulation system 100 comprises at least two, and here three, separate encapsulation mediums and three elongate cartridges containing the encapsulation mediums. Specifically, the encapsulation system 100 of the first embodiment comprises a first cartridge 110 having a frangible casing 111 and containing a first encapsulation medium 112, a second cartridge 120 having a frangible casing 121 and containing a second encapsulation medium 122 and a third cartridge 130 having a frangible casing 131 and containing a third encapsulation medium 132. Each of the cartridges 110, 120, 130 is of a relatively standard sausage-like configuration, with the casing 111, 121, 131 comprising a heat-sealed tube of polyester film with a clip sealing each end of the casing 111, 121, 131.

The first encapsulation medium 112 comprises a curable first resin formulation, typically being a two-part resin formulation consisting of a curable component (commonly referred to as a "resin mastic") and a catalyst component (commonly referred to as a hardener). When mixed with the curable component, the catalyst component causes a chemical reaction curing the resin. The casing 111 of the first cartridge 110 is separated into two compartments by a polyester film (not shown) extending along the length of the casing 111, with the curable and catalyst components of the resin formulation being contained in the separate compartments.

The third encapsulation medium 132 comprises a curable third resin formulation. The third resin formulation is typically of a similar formulation to the first resin formulation, but may have a longer curing time. It is also envisaged that dissimilar resin formulations may be utilized. The casing 131 of the third cartridge 130 is typically identical to, or at least substantially identical to, the casing 111 of the first cartridge 110, again being separated into two compartments by a polyester film extending along the length of the casing 131, with the curable and catalyst components of the resin formulation being contained in the separate compartments.

The second encapsulation medium 122 is of a formulation that provides a lower bond strength and/or a lower compressive strength than the first and third resin formulations. It is preferred that the second encapsulation medium has a bond strength of less than 50% of the bond strength of each of the first and third resin formulations in use (i.e., when cured during installation for a curable second encapsulation medium), and a compressive strength that is less than 50% of the compressive strength of the first and third resin formulations in use.

The second encapsulation medium 122 may be in the form of a second resin formulation having a lower bond strength and/or lower compressive strength when cured or otherwise may comprise an inert filler compound (that may or may not be subject to curing in use). For embodiments where the second encapsulation medium 122 is in the form of a second resin formulation, particularly a two-part resin formulation consisting of a curable component and a catalyst component, the casing 121 of the second cartridge 120 may be identical to the casings 111, 131 of the first and third cartridges 110, 130. In such a form, the interior of the casing 121 will again be separated into two compartments by a polyester film extending along the length of the casing 121, with the curable and catalyst components of the resin formulation being contained in separate compartments. For embodiments where the second encapsulation medium is an inactive/inert filler compound, the casing 121 of the second cartridge 120 may define a single compartment containing the second encapsulation medium 122. Alternatively, the casing 121 of the second cartridge 120 may have two compartments, with the compartment which would otherwise contain the catalyst component being left empty. By having the second encapsulation medium 122 with a lower bond strength and/or lower compressive strength than that of the first and third resin formulations, a debonded or at least relatively lightly bonded region may be formed in a rock bolt installation, as will be further discussed below.

The first and third resin formulations may be standard formulations, typically either a polyester based resin formulation incorporating a mix of coarse and fine limestone based fillers or an acrylic based resin formulation. The first resin formulation may be selected so as to have a faster curing time, typically referred to as a "fast resin", than the curing time of the third resin formulation, typically referred to as a "slow resin". Fast resins will typically have a curing time of the order of around 6 to 30 seconds, or around 6 to 15 seconds, although other times are possible. Slow resins will typically have a curing time of from about 30 seconds to of the order of minutes, although other times are possible. The first and third resin formulations may typically have a ratio between the curable component and catalyst component of anywhere from 15:1 up to 2:1.

The second encapsulation medium may be formulated to have a reduced bond strength and/or compressive strength by using a resin formulation that is weaker when cured, having a weaker curable component or other alternate chemical properties to embrittle or reduce polymerisation of the resin formulation, as compared to the first and third resin formulations. The second encapsulation medium may also be weakened by removal of limestone fillers, or utilising only very fine particulate fillers, in the resin formulation. A further alternate means of weakening the second encapsulation medium may be to utilise a resin formulation without the catalyst component, such that the remaining curable component will remain uncured, or otherwise reducing the content of the catalyst component, resulting in incomplete curing of the resin. A further chemical additive could also be added to the second encapsulation medium to make any catalyst component inert. It is also envisaged that the second encapsulation medium may be in the form of a non-resin based inert/inactive medium.

Figure 2:
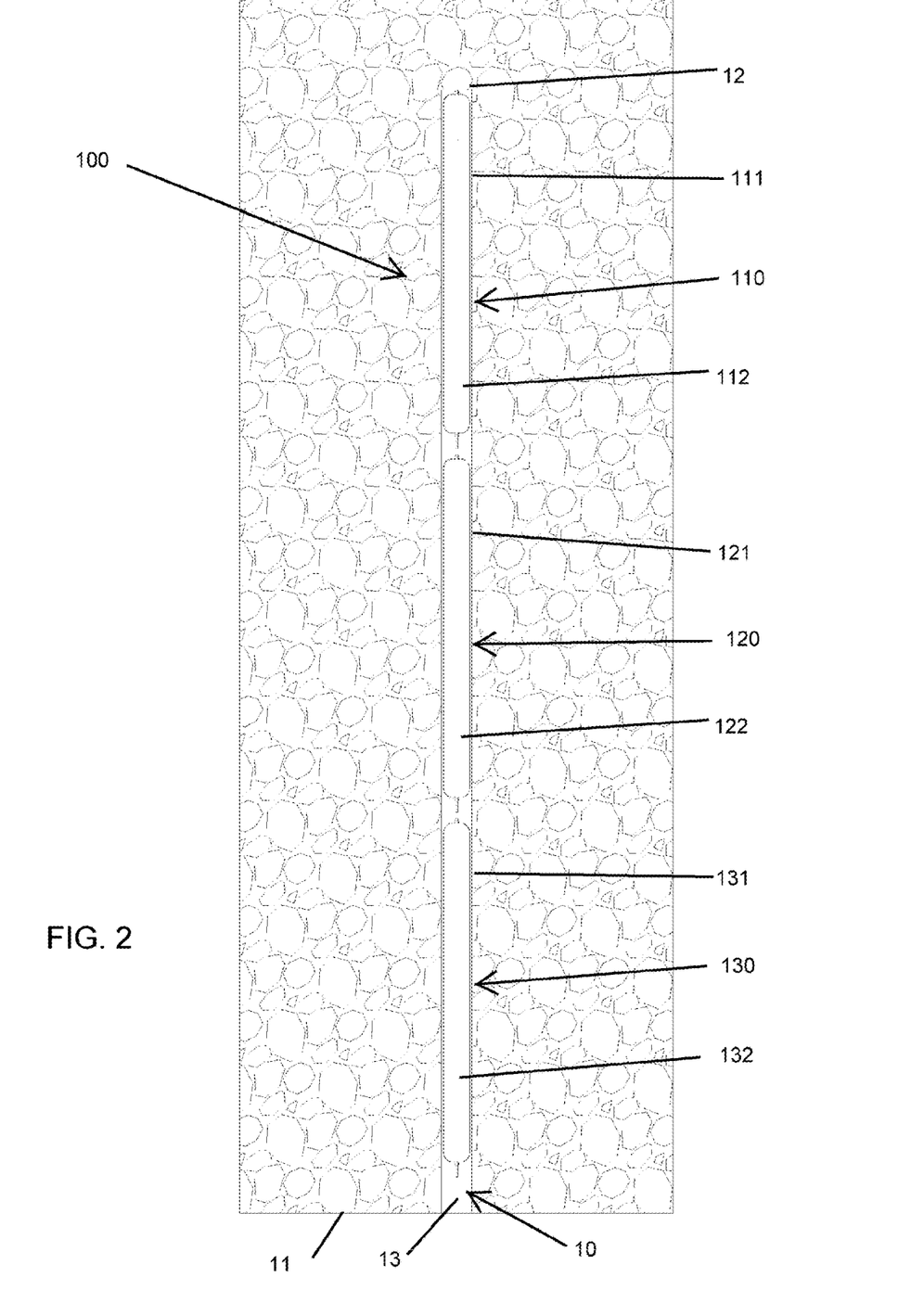
FIG. 2 is a cross section or front elevation view of the encapsulation system of FIG. 1 inserted into a bore hole.
Figure 3:
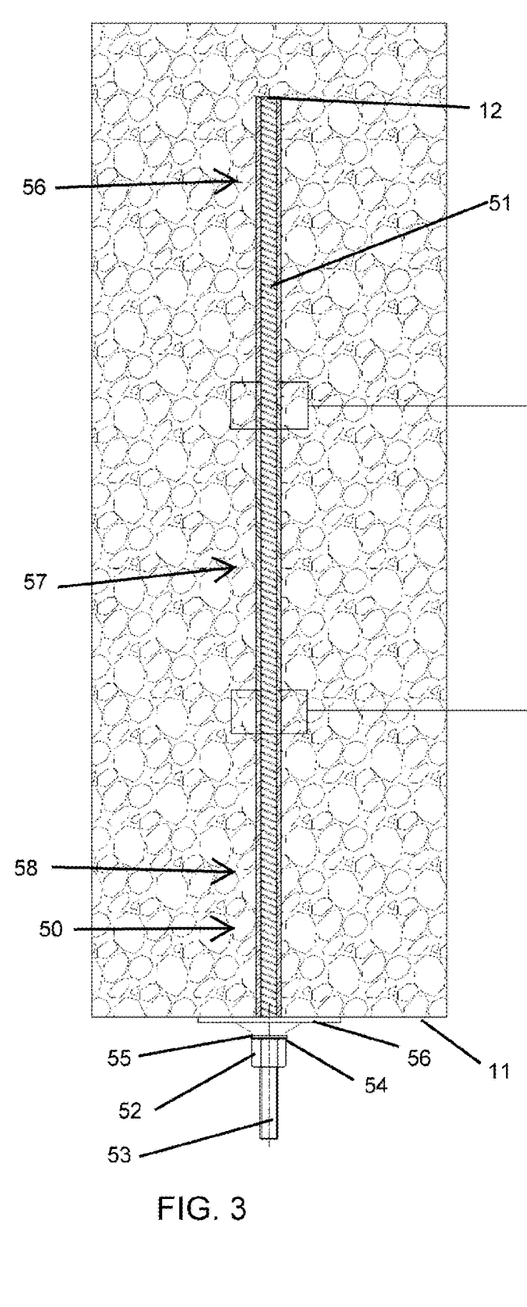
FIG. 3 is a partially cross sectioned front elevation view of a rock bolt installation incorporating the encapsulation system of FIG. 1.

Installation of a rock bolt utilizing the encapsulation system 100 will now be described with reference to FIGS. 2 and 3 of the accompanying drawings. A bore hole 10 is firstly drilled into a rock face 11 to be stabilised in the usual manner. The encapsulation system 100 is then inserted into the bore hole 10. The first cartridge 110 is first inserted, followed by the second cartridge 120 and finally the third cartridge 130. The first cartridge 110 is advanced toward the upper blind end 12 of the bore hole 10 by the following second and third cartridges 120, 130. The first cartridge 110 longitudinally extends over an upper portion of the bore hole 10, the second cartridge 120 extends over a central portion of the bore hole 110 whilst the third cartridge 130 extends over a lower portion of the bore hole 130, from adjacent the bore hole opening 13. The first, second and third cartridges 110, 120, 130 are sized so as to extend substantially along the length of the bore hole 10.

A rock bolt 50 is then inserted into the bore hole 10. In the arrangement depicted in FIG. 3, the rock bolt 50 comprises an elongate load bearing element in the form of a rigid bar 51 of a standard configuration. A drive nut 52 is threadingly mounted on a threaded end 53 of the bar 51. An anti-friction washer 54, dome washer 55 and plate washer 56 are mounted on the bar 51 above the drive nut 52 in a known manner. The rock bolt 50 is typically inserted into the bore hole 10 by a standard installation rig, with the drive nut 52 mounted in the installation dolly of the installation rig. The bar 51 is thrust toward the blind end 12 of the bore hole 10 by the installation rig. The bar 51 is thrust through the encapsulation system 100 defined by the first, second and third cartridges 110, 120, 130 toward the blind end 12 of the bore hole 10. As the bar 51 is thrust upwardly, it is also rotated by the installation rig. Thrust and rotation of the bar 51 ruptures the frangible casing 111, 121, 131 of each of the cartridges 110, 120, 130 and mixes the curable and catalyst components of each encapsulation medium 112, 122, 132.

As well as mixing the curable and catalyst components of each resin formulation, thrusting and rotating of the bar 51 through the cartridges 110, 120, 130 results in the mixing resin at least substantially fully encapsulating the bar 51 within the bore hole 10, filling the annulus between the rigid bar 51 and the wall of the bore hole 10. With the locations of the first, second and third cartridges 110, 120, 130, the first encapsulation medium 112 encapsulates a leading portion 56 of the bar 51, the second encapsulation medium 122 encapsulates an intermediate portion 57 of the bar 51 that extends between the leading portion 56 and a trailing portion 58 of the bar 51, whilst the third encapsulation medium 132 at least partly encapsulates the trailing portion 58 of the bar 51, and in particular encapsulates the region of the trailing portion 58 of the bar 51 that is located within the bore hole 10 (with the threaded end 53 of the bar 51 projecting beyond the bore hole 50.

Figure 4:
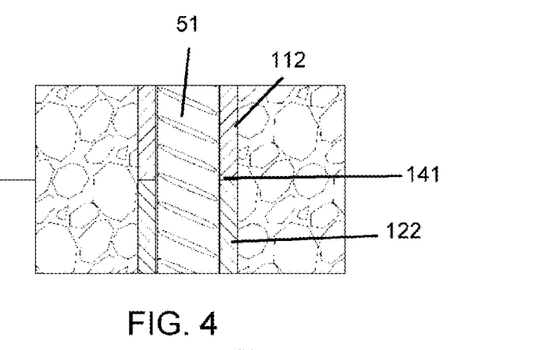
FIG. 4 is an enlarged detail view of detail A of FIG. 3.
Figure 5:
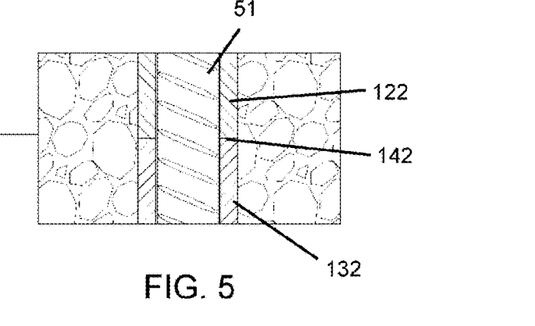
FIG. 5 is an enlarged detail view of detail B of FIG. 3.

The present inventors have found that, whilst there may be some intermixing of the first and second encapsulation mediums 112, 122 at a first interface 141 therebetween, and of the second and third encapsulation mediums 122, 132 at a second interface 142 therebetween, such intermixing is expected to be typically limited to a distance of the order of 50-100 mm. Such limited intermixing should not significantly affect load transfer performance of the encapsulation system 100 as a whole. FIG. 4 depicts the first interface 141 between the first and second encapsulation mediums 112, 122, schematically representing a distinct interface whereas, as noted above, the interface will effectively form an intermixing zone of limited length. Similarly, FIG. 5 depicts the second interface 142 between the second encapsulation medium 122 and third encapsulation medium 132. Again, rather than forming a distinct interface, an intermixing zone of limited length will typically be formed.

After mixing of the encapsulation mediums by rotation of the bar 51, rotation is ceased to allow the resin formulations constituting the encapsulation mediums to cure. For embodiments where the first resin formulation constituting the first encapsulation medium 112 is a fast set resin formulation, the first resin formulation will typically cure within 6 to 30 seconds, whilst the second and third encapsulation mediums 122, 132 have not fully cured. The first encapsulation medium 112 thus rapidly forms a point anchor, anchoring the leading portion 56 of the bar 52 within the bore hole 650 adjacent the blind end 12 of the bore hole 10. After curing of the first encapsulation medium 112 and prior to full curing of the second and third encapsulation mediums, the bar 51 may be pre-tensioned by applying an increased torque to the drive nut 52 in the usual manner. With the bar 51 being restrained from rotation by the cured first encapsulation medium 112, the torque applied will advance the drive nut 52 along the threaded trailing end 53 of the bar 51, thereby applying tension to the bar 51. The drive nut 52 bears against the anti-friction washer 54, dome washer 55 and plate washer 56 against the rock face 11, resulting in the bar 51 being drawn through the drive nut 52 to apply the tension.

Upon subsequent curing of the third resin formulation, the trailing portion 58 of the bar 51 is anchored within the lower region of the bore hole 10. For embodiments where the second encapsulation medium 122 is in the form of a curable second resin formulation, the second resin formulation will also cure, but, following installation, will have a lower bond strength and/or compressive strength than the first and third resin formulations. This will thus have a similar effect to having a full resin encapsulation system with the resin physically debonded from the intermediate portion 57 of the bar 51, by allowing the intermediate portion 57 of the bar 51 to yield in response to movement of the rock strata whilst maintaining anchorage of the leading and trailing portions 56, 58 of the bar 51 within the bore hole 10. In such dynamic loading applications, the second encapsulation medium 122 will allow the intermediate portion 57 of the bar 51 to yield either by debonding of the second encapsulation medium 122 from the surface of the intermediate portion 57 of the bar 50, by virtue of its reduced bonding strength and/or by failure of the second encapsulation medium 122 by virtue of its reduced strength.

Figure 6:
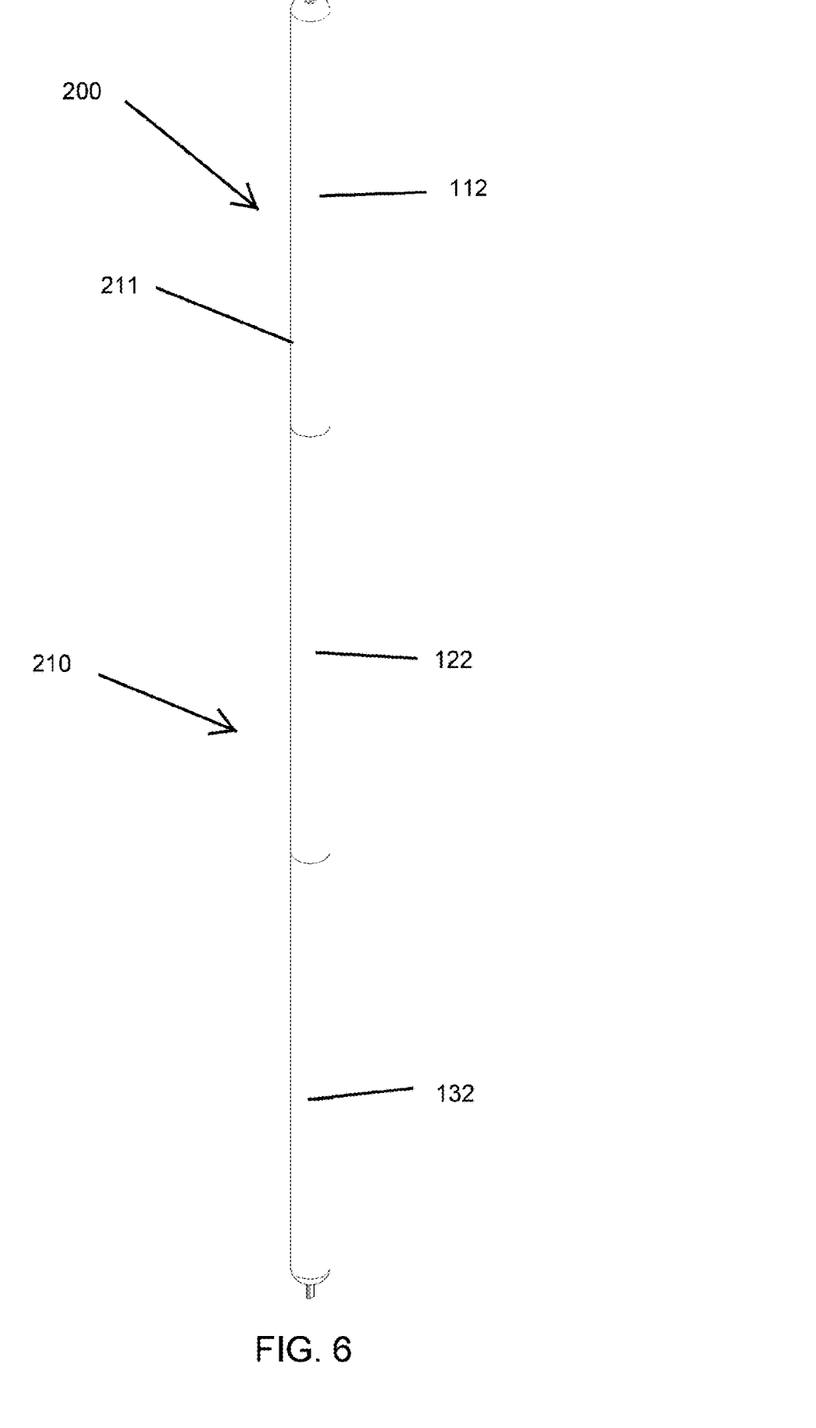
FIG. 6 is an isometric view of an encapsulation system according to a second embodiment.

FIG. 6 depicts an encapsulation system 200 according to a second embodiment. The encapsulation system 200 again comprises separate first, second and third encapsulation mediums 112, 122, 132 as described above in relation to the first embodiment. In the second embodiment, however, the encapsulation mediums 112, 122, 132 are contained within a single cartridge 210. The cartridge 210 is of a further elongated form, effectively having a length comparable to the length of the bore hole 10. The cartridge 210 has a frangible casing 211 of the same form as that of each of the cartridges of the first embodiment, here comprising a heat-sealed tube of polyester film with clips sealing each end of the casing 211. In the cartridge 210, the interior of the casing 211 contains all three of the encapsulation mediums 112, 122, 132 arranged in longitudinal succession. The cartridge 210 is arranged such that the second encapsulation medium 122 is located between the first and third encapsulation mediums 112, 122. Within each region, the curable and catalyst components of each resin formulation are again separated by a polyester film extending along the length of the casing 211. A single polyester film will typically extend the full length of the casing 211.

Figure 7:
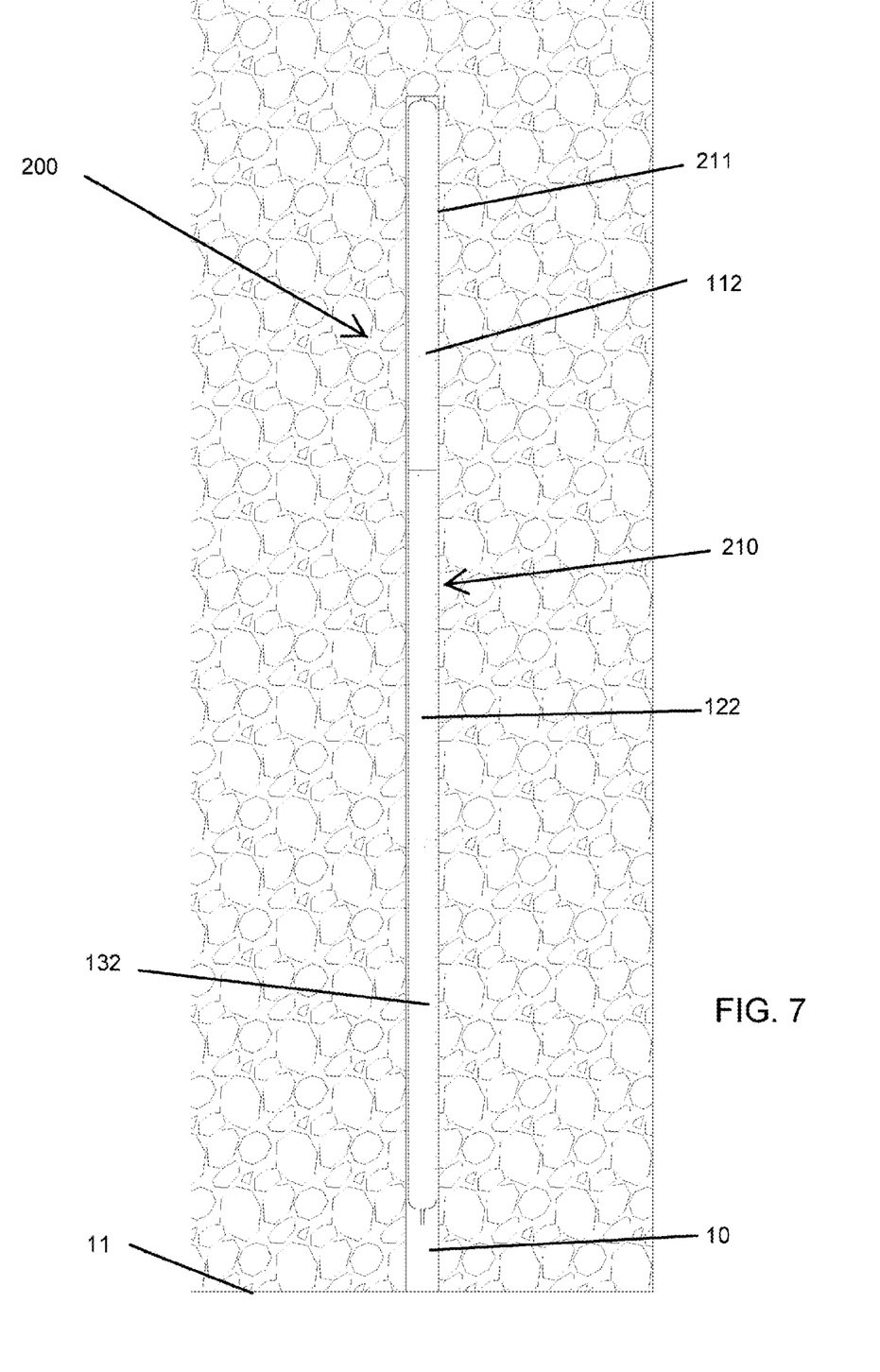
FIG. 7 is a cross sectional front elevation view of the encapsulation system of FIG. 6 inserted into a bore hole.

Referring to FIG. 7, in use, the cartridge 210 is inserted into the bore hole 10 with the first encapsulation medium 112 leading. The bar 51 forming the load bearing element of the rock bolt 50 is then inserted into the bore hole 50, thrust and rotated in the same manner as discussed above in relation to the first embodiment. This configuration of encapsulation system 200 again results in the first encapsulation medium 121 encapsulating the leading portion 56 of the bar 51, the second encapsulation medium 122 encapsulating the intermediate portion of the bar 51 and the third encapsulation medium 132 encapsulating the trailing portion 58 of the bar 51. The encapsulation mediums are allowed to be cured and the rock bolt 50 pre-tensioned if desired in the same manner as discussed above. The completed rock bolt installation is thus substantially the same as the completed rock bolt installation of FIG. 4 discussed above.

Figure 8:
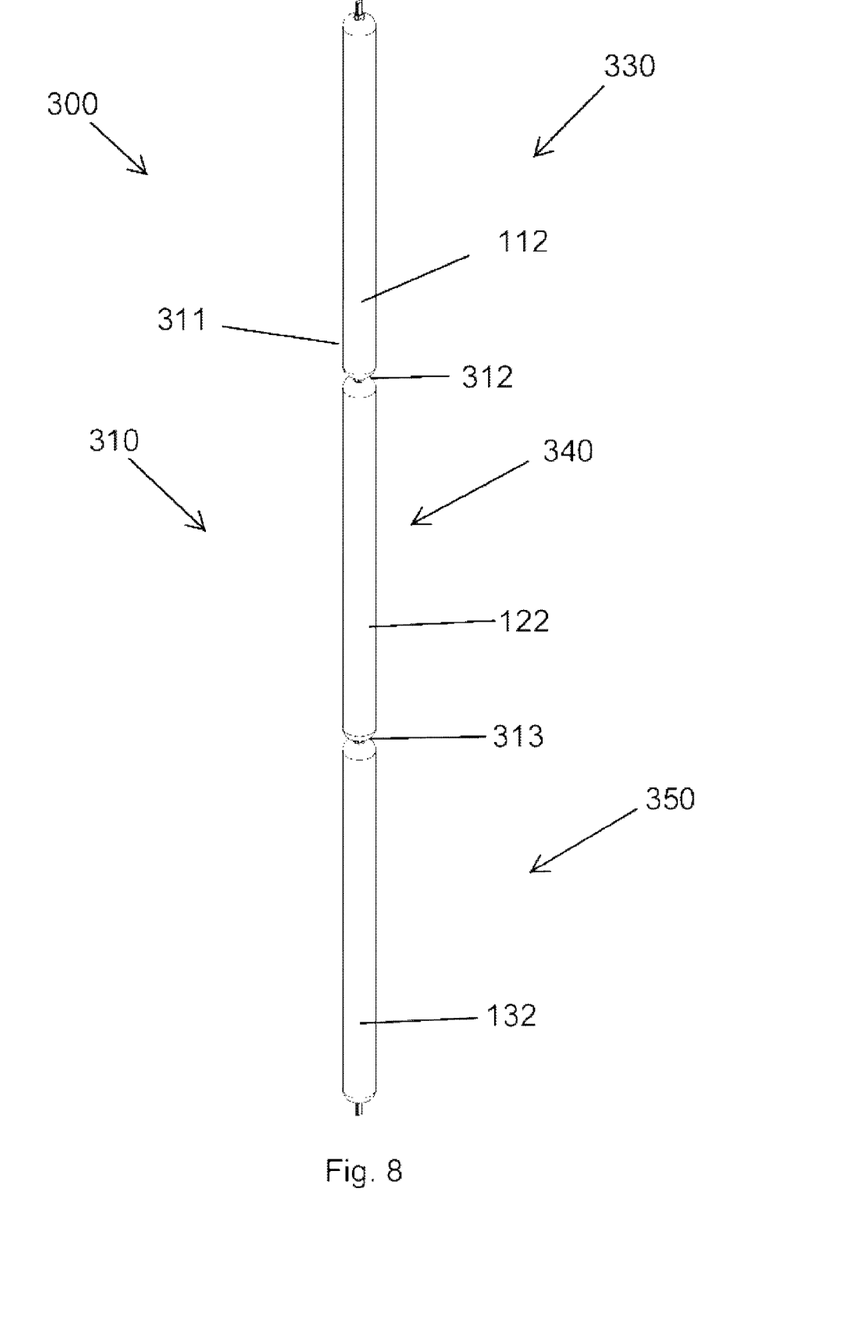
FIG. 8 is an isometric view of an encapsulation system according to a third embodiment.

FIG. 8 depicts an encapsulation system 300 according to a third embodiment. Again, as with the first and second embodiments, the encapsulation system 300 comprises the first, second and third encapsulation mediums 112, 122, 132. The three encapsulation mediums 112, 122, 132 are again contained within a single cartridge 310 having a frangible casing 311. Rather than having one continuous interior of the casing 311, two pinches or other form of constrictions 312, 313 are formed in the case along its length to define three substantially separate regions 330, 340, 350 each containing one of the encapsulation mediums 112, 122, 132. In the depicted embodiment, the first region 330 contains the first encapsulation medium 112, the second region 340 contains the second encapsulation medium 122 and the third region 350 contains the third encapsulation medium. Forming constrictions 312, 313 in the casing 310 may still provide for some communication between the regions of the interior of the casing 311, still allowing for some intermixing between the encapsulation mediums prior to curing, however this should not have any notable effect on the performance of the encapsulation system. The constrictions 312, 313 may be formed with clips. Having one elongate cartridge allows the encapsulation system to be handled and installed as one continuous assembly.

Figure 9:
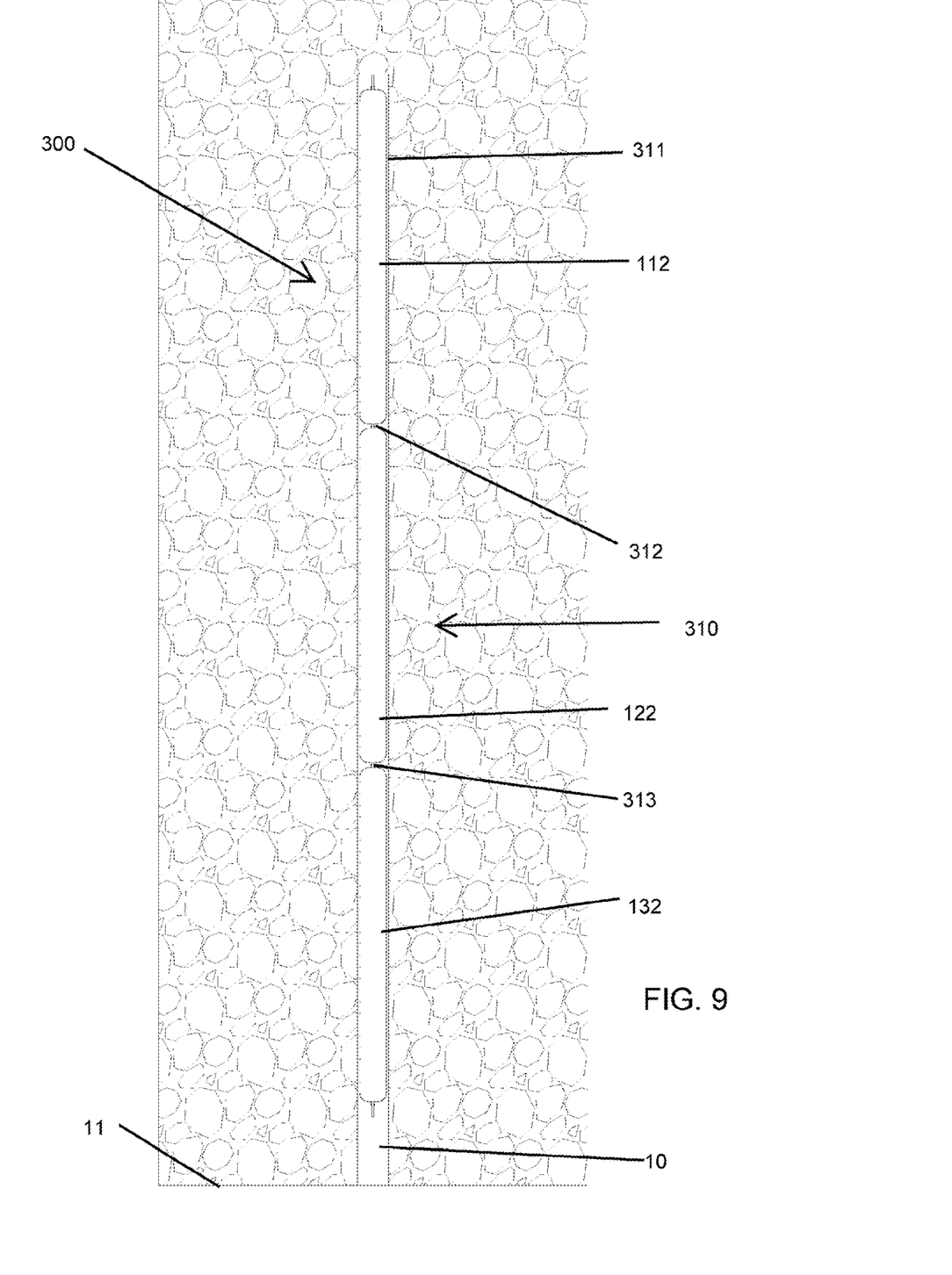
FIG. 9 is a cross sectional front elevation view of the encapsulation system of FIG. 8 inserted into a bore hole.

Referring to FIG. 9, during installation, the cartridge 310 is again inserted with the first encapsulation medium 112 leading. The remainder of the installation of the rock bolt 50 is as discussed above.

Figure 10:
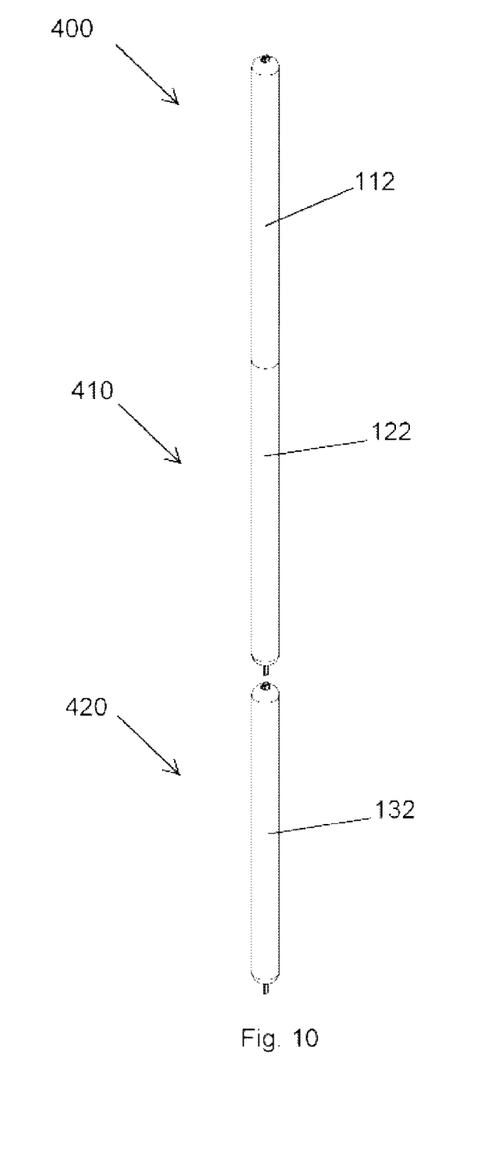
FIG. 10 is an isometric view of an encapsulation system according to a fourth embodiment.

Various combinations/modifications of the encapsulation systems of the first to third embodiments are envisaged, for example with three encapsulation mediums contained in two separate cartridges, with one cartridge housing two encapsulation mediums and a second cartridge housing one of the encapsulation mediums. One such arrangement is depicted in FIG. 10, depicting an encapsulation system 400 of a fourth. In the encapsulation system 400, the first and second encapsulation mediums 112, 122 are contained in a first cartridge 410, whilst the third encapsulation medium 132 is contained within a separate second cartridge 420. The first cartridge 410 could be arranged with a single continuous interior, or otherwise arranged with a constriction to define two substantially separate regions each containing one of the encapsulation mediums 112, 122 in equivalent manner to that described above in relation to the encapsulation system 300 of the third embodiment.

Figure 11:
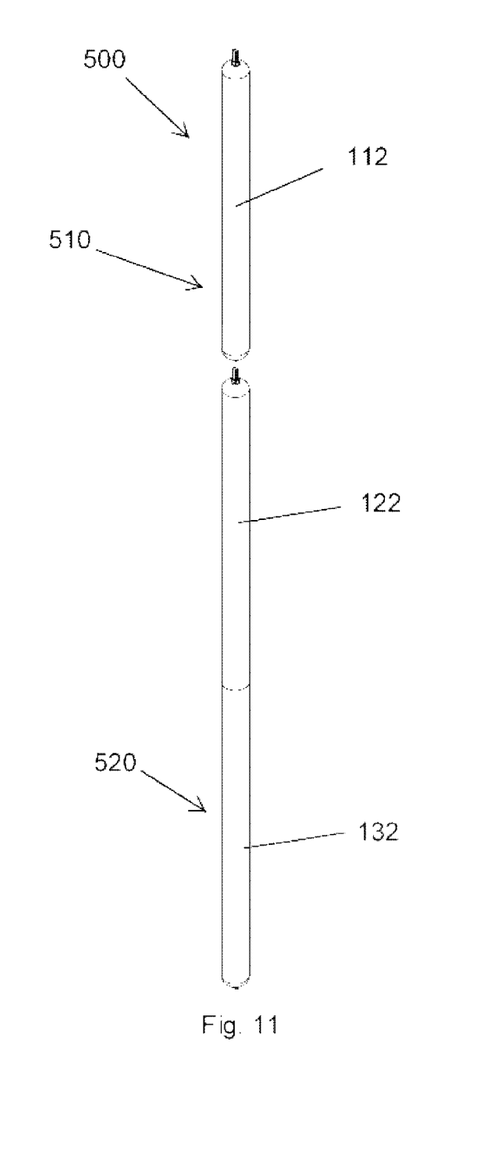
FIG. 11 is an isometric view of an encapsulation system according to a fifth embodiment.

FIG. 11 depicts an encapsulation system 500 according to a fifth embodiment, in which the first encapsulation medium 112 is contained in a first cartridge 510 and the second and third encapsulation mediums 122, 123 are contained in a separate second cartridge 520. Again, the second cartridge 520 may have a constriction formed in the case to define two substantially separate regions each containing one of the encapsulation mediums 122, 132 if so desired.

Figure 12:
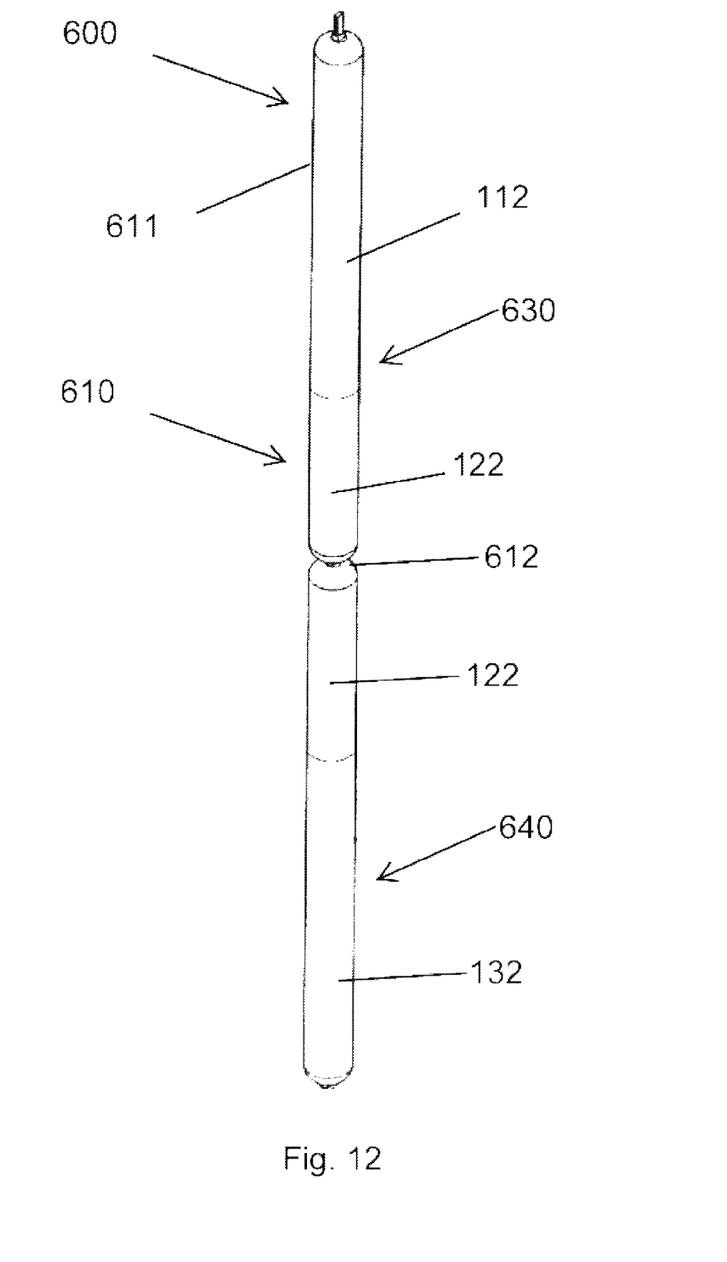
FIG. 12 is an isometric view of an encapsulation system according to a sixth embodiment.

FIG. 12 depicts a sixth example embodiment of the encapsulation system 600, with the three encapsulation mediums 112,122,132 contained within a single cartridge 610 having a frangible casing 611. In a similar manner to the third embodiment of FIG. 8, a constriction 612 is formed in the frangible casing 611 along its length to define two substantially separate regions 630,640. The encapsulation mediums 112,122,132 are arranged in longitudinal succession, with the first encapsulation medium 112 contained within the first region 630, the third encapsulation medium 132 contained within the second region 640, and the second encapsulation medium 122 contained within both the first region 630 and second region 640 on either side of the constriction 612.

A person skilled in the art will appreciate various other alternatives to the encapsulation system and method described. For example, it is envisaged that, rather than utilising the first, second and third encapsulation mediums, an encapsulation system may be utilised incorporating only the first and second 112, 122 encapsulation mediums, omitting the third encapsulation medium 132 where additional anchoring of the lower portion 58 of the rock bolt 50 is not desired. For such applications, the encapsulation system 100 of the first embodiment would be modified by omitting the third cartridge 130. The encapsulation system 200 of the second embodiment would be modified by omitting the third encapsulation medium 132. The encapsulation system 300 of the third embodiment would be modified by omitting the second constriction 312 and third encapsulation medium 132. Whilst the rock bolt installation described above have been described in relation to a rock bolt having a rigid bar form of elongate load bearing element, it is also envisaged that the encapsulation systems described may be utilised in conjunction with cable bolt forms of rock bolt, where the elongate load bearing element is in the form of a cable/strand.

What is claimed is:

1. An encapsulation system for use in securing a rock bolt in a bore hole drilled into a rock face to be stabilised, said encapsulation system comprising at least two separate encapsulation mediums and one or more elongate cartridges containing said encapsulation mediums, each said cartridge having a frangible casing, said encapsulation mediums including:
   a first encapsulation medium comprising a curable first resin formulation; and a second encapsulation medium comprising a curable second resin formulation;
   wherein, following use in securing a rock bolt, said second resin formulation has a lower bond strength and/or a lower compressive strength than said first resin formulation.

2. The encapsulation system of claim 1, wherein said second resin formulation has a longer curing time than said first resin formulation.

3. The encapsulation system of claim 1, wherein said encapsulation system further comprises a third encapsulation medium comprising a curable third resin formulation;
   wherein, following use in a securing a rock bolt, said second encapsulation medium has a lower bond strength and/or a lower compressive strength than said third resin formulation.

4. The encapsulation system of claim 3, wherein said third resin formulation has a longer curing time than said first resin formulation.

5. The encapsulation system of claim 3, wherein said one or more elongate cartridges comprises a first cartridge containing said first encapsulation medium, a second cartridge containing said second encapsulation medium and a third cartridge containing said third resin formulation.

6. The encapsulation system of claim 3, wherein said encapsulation system comprises a single cartridge containing each of said encapsulation, and wherein said second encapsulation medium is located between said first and third encapsulation mediums; or wherein said encapsulation system comprises a single cartridge containing each of said encapsulation mediums, said casing having one or more constrictions formed along its length to define multiple regions along in an interior of said casing, and wherein said second encapsulation medium is located between said first and third encapsulation mediums.

7. The encapsulation system of claim 6, wherein each said region contains one of said encapsulation mediums, wherein the casing has one constriction formed along its length defining a first region and a second region, and wherein the first encapsulation medium is contained in the first region, the third encapsulation medium is contained in the second region, and the second encapsulation medium is contained in both the first and second regions.

8. The encapsulation system of claim 3, wherein said second resin formulation comprises an inert filler compound, and said first and third resin formulations comprise a curable component and a catalyst component.

9. The encapsulation system of claim 1, wherein, said encapsulation system comprises a separate said cartridge containing each said encapsulation medium.

10. The encapsulation system of claim 1, wherein said encapsulation system comprises a single cartridge containing each of said encapsulation mediums, said encapsulation mediums being arranged in longitudinal succession along an interior of said casing; or wherein said encapsulation system comprises a single cartridge containing each of said encapsulation mediums, said casing having one or more constrictions formed along its length to define multiple regions along in an interior of said casing.

11. The encapsulation system of claim 1, wherein said first and second resin formulations comprises a curable component and a catalyst component.

12. A method of installing a rock bolt into a bore hole drilled into a rock face to be stabilised, said method comprising:
- inserting an encapsulating system into the bore hole, said encapsulation system comprising at least two encapsulation mediums and one or more elongate cartridges containing said encapsulation mediums, each said cartridge having a frangible casing, said encapsulation mediums including a first encapsulation medium inserted into the bore hole followed by a second encapsulation medium, said first encapsulation medium comprising a curable first resin formulation;
- inserting a rock bolt comprising an elongate load bearing element into the bore hole, thrusting said load being element through said encapsulating system towards a blind end of the bore hole and rotating said load bearing element so as to rupture said frangible casing of each said cartridge and mix each of said encapsulation mediums such that said first encapsulation medium encapsulates a leading portion of said load bearing element located adjacent a blind end of said borehole and said second encapsulating medium encapsulates an intermediate portion of said load bearing element extending between said leading portion of said load bearing element and a trailing portion of said load bearing element; and
- curing said first resin formulation to secure leading portion of said load bearing element in said bore hole;
- wherein, upon completion of said installation, said second encapsulation medium has a lower bond strength and/or a lower compressive strength than said first resin formulation.

13. The method of claim 12, wherein said second encapsulation medium comprises a second resin formulation, said method further comprising curing said second resin formulation.

14. The method of claim 13, wherein, said encapsulation system further comprises a third encapsulation medium comprising a curable third resin formulation, inserting said encapsulation system into the bore hole including inserting said third encapsulation medium into the bore hole after said second encapsulation medium, said third encapsulation medium at least partly encapsulating said trailing portion of said load-bearing element, said method further comprising curing said third resin formulation to secure said trailing portion of said load bearing element in said bore hole;
- wherein upon completion of said installation, said second encapsulation medium has a lower bond strength and/or a lower compression strength than said third resin formulation.

15. The method of claim 14, wherein said first resin formulation is fully cured prior to said third resin being fully cured.

16. The method of claim 14, wherein said method further comprises, after curing of said first resin, tensioning said load bearing element, said load bearing element is tensioned prior to said third resin being fully cured.

17. The method of claim 13, said method further comprises, after curing of said first resin, tensioning said load bearing element, wherein said load bearing element is tensioned prior to said second resin being fully cured.

18. The method of claim 12, wherein, said method further comprises, after curing of said first resin, tensioning said load bearing element.

19. The method of claim 12, wherein said encapsulation system comprises a separate said cartridge containing each said encapsulation medium, inserting said encapsulation system into said bore hole including inserting a first cartridge containing said first encapsulation medium into said bore hole, followed by inserting a second cartridge containing said second encapsulation medium into said bore hole; or wherein said encapsulation system comprises a single cartridge containing each of said encapsulation mediums, inserting said encapsulation system into said bore hole including inserting said cartridge into said bore hole with said first encapsulation medium leading.

* * * * *